United States Patent [19]
Tashiro et al.

[11] Patent Number: 5,919,058
[45] Date of Patent: Jul. 6, 1999

[54] CONNECTOR-CONNECTION STRUCTURE

[75] Inventors: Harunori Tashiro; Shinji Kodama, both of Shizuoka, Japan

[73] Assignee: Yazaki Corporation, Tokyo, Japan

[21] Appl. No.: 08/931,614

[22] Filed: Sep. 16, 1997

[30] Foreign Application Priority Data

Sep. 18, 1996 [JP] Japan .................................. 8-246107
Apr. 30, 1997 [JP] Japan .................................. 9-113062

[51] Int. Cl.$^6$ .................................................. H01R 13/64
[52] U.S. Cl. ........................................................ 439/374
[58] Field of Search ................................. 439/374, 680, 439/297, 298, 247, 248; 361/428; 174/72

[56] References Cited

U.S. PATENT DOCUMENTS

| | | | |
|---|---|---|---|
| 4,418,975 | 12/1983 | O'Keefe, II | 339/91 |
| 4,939,622 | 7/1990 | Weiss et al. | 361/391 |
| 4,984,993 | 1/1991 | Neumann et al. | 439/157 |
| 5,788,532 | 8/1998 | Takiguchi et al. | 439/374 |
| 5,823,815 | 10/1998 | Takata | 439/374 |

*Primary Examiner*—Gary Paumen
*Assistant Examiner*—Alexander Gilman
*Attorney, Agent, or Firm*—Morgan, Lewis & Bockius LLP

[57] ABSTRACT

Slide portions 23 and connectors 28 are provided in an apparatus 6, guide portions 7 and inclined guide portions 5 are provided in a receiving portion 2, and slide portions 10 are provided in connection bodies 40. The apparatus abuts on the connection bodies, so that the connectors 28 face the connection bodies in the connector fitting direction. A plurality of stages of connectors may be provided in the apparatus and a plurality of stages of inclined guide portions may be provided so that slide portions of the connection bodies are engaged with the inclined guide portions respectively. The inclined guide portions are provided so as to be displaced in the apparatus pushing-in direction. Horizontal escape portions are continued to one of the inclined guide slots. Each of the connection bodies may contain a connector frame. Each slid portion may includes a flat portion or two slide protrusion contacting with the inclined guide slot. Wire harnesses 15 led out of the connection bodies are located in a free space in the receiving portion so as to be perpendicular to the apparatus pushing-in direction.

11 Claims, 17 Drawing Sheets

CONNECTOR-CONNECTION STRUCTURE

BACKGROUND OF THE INVENTION

1. Field of the Invention

The present invention relates to a connector-connection structure in which, for example, installation of a metering unit in a car instrument panel and connection of connectors respectively contained in the metering unit and the instrument panel are performed simultaneously.

2. Related art

FIG. 24 shows a state in which a metering unit (apparatus) 52 is installed in a car instrument panel 51.

Female connectors 53 are provided in the back of the metering unit 52. After the female connectors 53 are connected to male connectors 54 in a receiving portion 56 of the instrument panel 51, the metering unit 52 is installed in the receiving portion 56.

FIG. 25 shows a state in which the male connectors 54 in the instrument panel are connected to the female connectors 53 in the metering unit 52. An operator connects the male connectors 54 one by one manually into the female connectors 53 by means of a lever operation, a locking means, or the like.

For the connection of the connectors for the metering unit, however, wire harnesses 55 continued to the connectors 54 of the instrument panel must be drawn out or the connecting work must be carried out in the narrow receiving portion 56 (FIG. 24). There arises a problem that very troublesome and many labors are required. Furthermore, as shown in FIG. 26, there is a fear that the wire harnesses 55 which are loosened are caught in between the metering unit 52 and the instrument panel 51 when the metering unit 52 is pushed into the instrument panel 51. Accordingly, it is necessary to carry out the work carefully.

SUMMARY OF THE INVENTION

Taking the aforementioned problems into consideration, an object of the present invention is to provide a connector-connection structure in which an apparatus such as a metering unit, or the like, can be easily and securely connected to a receiving portion on an assembly side, for example, on an instrument panel, or the like, through connectors without any fear that wire harnesses are caught in between the apparatus and the receiving portion. direction.

In order to achieve the above object, according to a basic aspect of the present invention, provided is a connector-connection structure comprising: first slide portions provided in an apparatus; connectors disposed in a push end side of said apparatus; guide portions provided in a receiving portion to which said apparatus is pushed in, said guide portions corresponding to said slide portions; inclined guide portions provided in said receiving portion so as to correspond to connection bodies in said receiving portion; and second slide portions provided in said connection bodies so as to correspond to said inclined guide portions; wherein said second slide portions of said connection bodies are engaged with said inclined guide portions and said first slide portions of said apparatus are engaged with said guide portions so that said apparatus abuts on said connection bodies and said connectors of said apparatus and said connection bodies of said receiving portion are disposed so as to face each other in a connection fitting direction.

In the above connector-connection structure, preferably, said connectors may be provided in a plurality of stages in said apparatus whereas said inclined guide portions are provided in a plurality of stages in said receiving portion so that said slide portions of said connection bodies are fitted to said inclined guide portions respectively.

In the above connector-connection structure, preferably, said plurality of stages of inclined guide portions are provided so as to be displaced from each other successively in an apparatus pushing-in direction.

In the above connector-connection structure, preferably, said inclined guide portions near said apparatus are continued to horizontal escape portions respectively whereas said inclined guide portions far from said apparatus are located above or below said horizontal escape portions respectively.

In the above connector-connection structure, preferably, each of said connection bodies may be constituted by a connector frame having a plurality of connectors.

In the above connector connection structure, preferably, an abutment plate for abutting on said apparatus may be provided in said connector frame.

In the above connector connection structure, preferably, a receiving portion for receiving said abutment plate may be formed between said apparatus and said connectors.

In the above connector connection structure, preferably, a horizontal guide portion may be continued to each of said inclined guide portions so that connector fitting is completed at an intersection of said inclined guide portion and said horizontal guide portion, and said slide portion of said connection body enters into said horizontal guide portion.

In the above connector-connection structure, preferably, each of said slide portions of said connection bodies may have a flat portion which is brought into contact with corresponding one of said inclined guide portions.

In the above connector-connection structure, preferably, each of said slide portions of said connection bodies may be constituted by two columnar slide protrusions which are parallel with each other.

In the above connectors-connection structure, preferably, wire harnesses led out of said connection bodies respectively may be disposed in a free space in said receiving portion so as to be perpendicular to an apparatus pushing-in direction.

Operations of the present invention based on the aforementioned configuration will be described below.

The connection bodies on the receiving portion side are inserted and set along the inclined guide portions. The apparatus is then pushed into the receiving portion along the guide portions. With the pushing of the apparatus into the receiving portion, the apparatus abuts on the connection bodies, so that the connection bodies are pressed up along the inclined guide portions. As a result, the connection bodies are fitted into the apparatus side connectors.

In the case where the connectors are disposed in a plurality of stages, the apparatus presses up one connection body along the front-side inclined guides to thereby fit the connection body into the first stage of connectors. The apparatus then presses up the other connection body along the rear-side inclined guides to thereby fit the other connection body into the second stage of connectors. Because the first stage of connectors and the second stage of connectors are fitted stage by stage, the apparatus-pressing force is constant. When the fitting of the first stage of connectors is completed, that is, when the fitting of the second-stage of connectors is to be performed, the slide porions in one connection body move horizontally along the horizontal escape portions.

Flat surfaces in each of the slide portions of the connection bodies are brought into surface-contact with corresponding one of the inclined guide portions. Further, the two columnar slide protrusions are brought into contact with the inclined guide portion at two points. As a result, the connectors are prevented from rotating.

Operations of the present invention based on the aforementioned configurations will be described below.

In the configuration stated in the present invention, the connection bodies on the receiving portion side are inserted along the inclined guide portions respectively so as to be set. Then, the apparatus is pushed into the receiving portion along the guide portions. With the pushing of the apparatus, the apparatus abuts on the connection bodies, so that the connection bodies are pressed up along the inclined guide portions respectively. Consequently, the connection bodies are fitted to the apparatus-side connectors respectively.

In the case where the connectors are disposed multistageously as stated in the present invention, the apparatus presses one connection body along the front-side inclined guides so that the connection body is fitted to the first stage of connectors. Then, the other connection body is pressed up along the rear-side inclined guides so that the other connection body is connected to the second stage of connectors. Because the first stage of connectors and the second stage of connectors are fitted in different timing, the force of pressing the apparatus is constant. When the second stage of connectors are to be fitted after the first stage of connectors are fitted perfectly, the slide portion of one connection body moves horizontally along the horizontal escape portion.

In the configuration stated in the present invention, the abutment plate of the connector frame increases the contact area between the abutment plate and the apparatus so that the posture of the connector frame is stabilized.

In the configuration stated in the present invention, the fitting of the connectors on the apparatus side to the connectors of the connection bodies and the entrance of the slide portions of the connection bodies into the horizontal guide portions are performed simultaneously, so that the indentation load of the apparatus is lowered rapidly. An operating person feels this bodily and finds the perfect connection of the connectors.

In the configuration stated in the present invention, the flat portion of the slide portion of the connection body is brought into surface-contact with the inclined guide portion. Further, in the configuration of the present invention, two columnar slide protrusions are brought into contact with the inclined guide portion at two points. Accordingly, the connectors are prevented from rotating.

DETAILED DESCRIPTION OF THE PREFERRED EMBODIMENTS

Specific examples of a mode for carrying out the present invention will be described below in detail.

Figure 1:
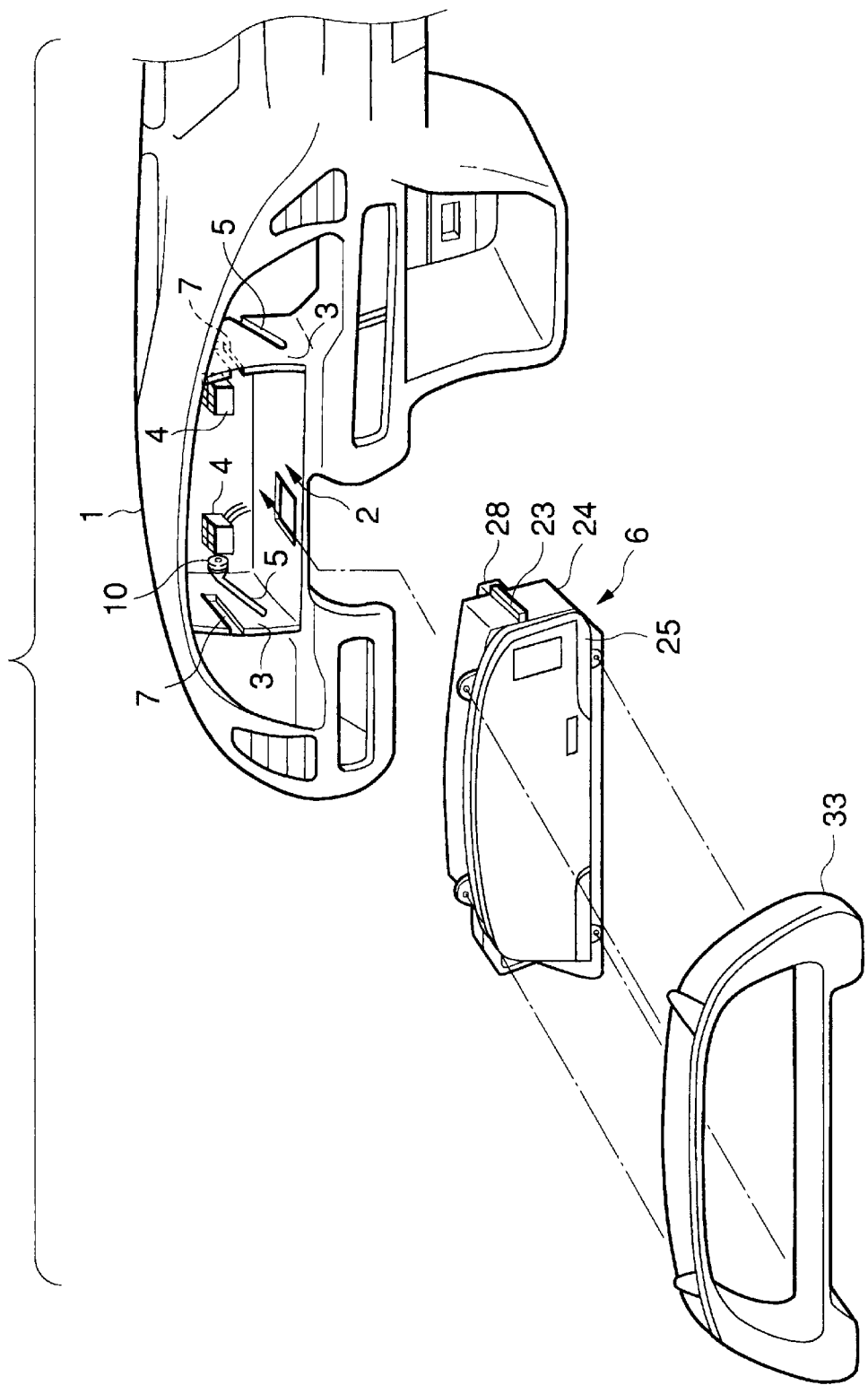
FIG. 1 is an exploded perspective view showing a first embodiment of a connector connection structure according to the present invention.
Figure 2:
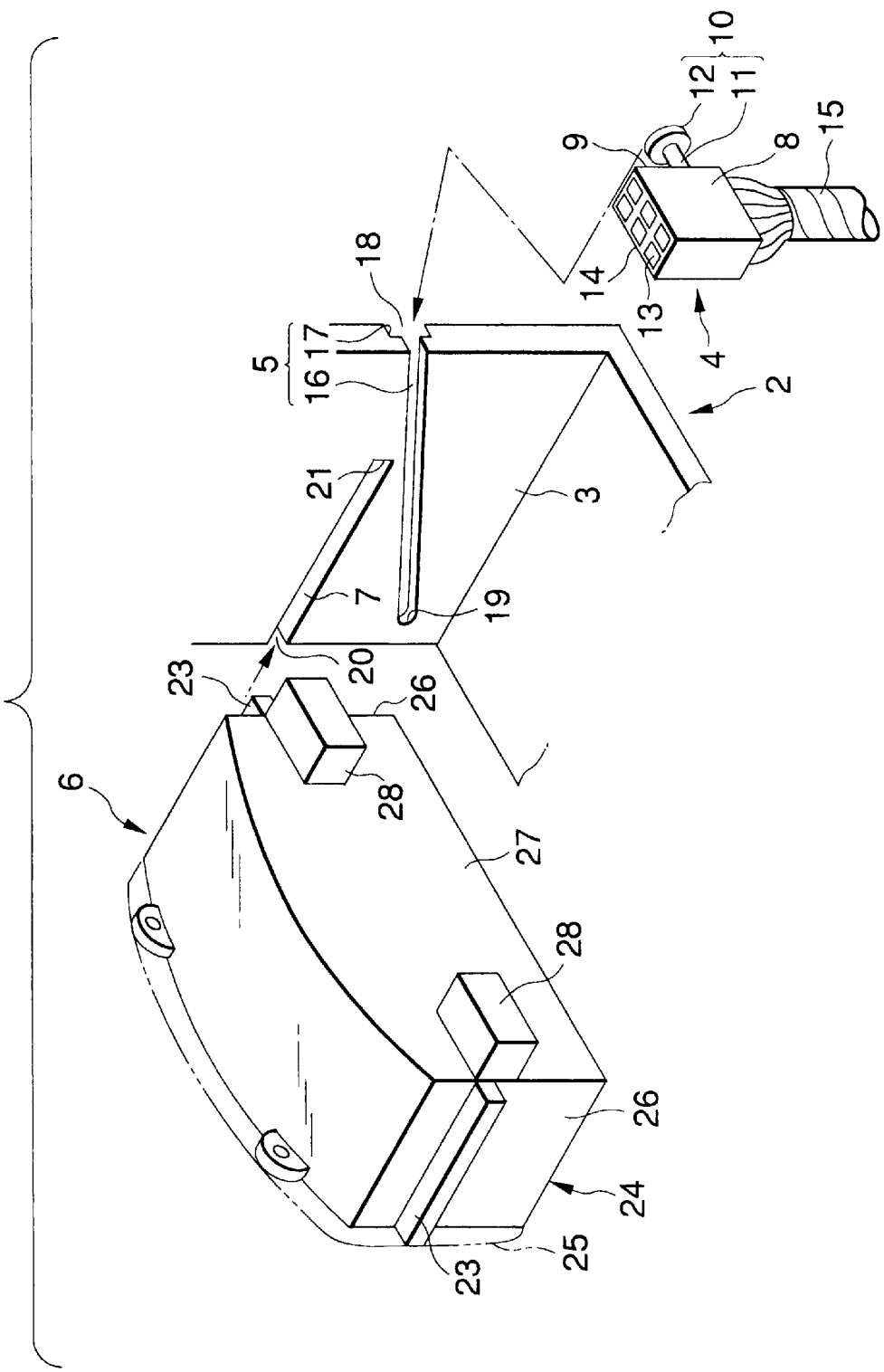
FIG. 2 is an exploded perspective view showing a main part of the connector connection structure.

FIG. 1 is an overall view showing a first embodiment of a connector-connection structure according to the present invention; and FIG. 2 shows a main part thereof.

As shown in FIG. 1, in opposite side walls 3, 3 of a meter receiving portion 2 in a car instrument panel 1, there are formed a pair of inclined guide slots (inclined guide portions) 5, 5 with which a pair of male connectors (connection bodies) 4, 4 on the instrument panel 1 side can be slidably engaged, and a pair of horizontal guide grooves (horizontal guide portions) 7, 7 with which a metering unit (apparatus) 6 can be slidably engaged from ahead. The horizontal guide grooves 7 are located above the inclined guide slots 5.

As shown in FIG. 2, each of the pair of male connectors 4, 4 located in the meter receiving portion 2 on the instrument panel 1 side has a slide protrusion (slide portion) 10 which is formed integrally in one (outer) side wall 9 of a synthetic resin connector housing 8 so that the slide protrusion 10 can engage with one of the inclined guide slots 5. The slide protrusion 10 is composed of a short columnar shaft portion 11, and a disk head portion 12 integrally formed at an end of the shaft portion 11. The instrument panel-side male connector 4 is disposed so as to face upward. A connector fitting surface 14 including openings of terminal receiving chambers 13 is located in the upper side of the male connector 4. Female terminals not shown are received in the terminal receiving chambers 13. A wire harness 15 connected to the female terminals is led out downward from the male connector 4.

Each of the inclined guide slots 5 is formed so as to pierce a side wall 3 of the meter receiving portion 2 and is composed of a narrow portion 16 capable of engaging with the shaft portion 11 of the slide protrusion 10 and a wide portion 17 capable of engaging with the head portion 12. The inclined guide slot 5 is formed by cutting the side wall 3 of the meter receiving portion 2 obliquely downward from the rear end to the front end, so that the inclined guide slot 5 has an inlet portion 18 at the rear end of the side wall 3, and an end portion 19 near the front end of the side wall 3.

On the other hand, each of the horizontal guide grooves 7 is formed by cutting the side wall 3 of the meter receiving portion 2 from the front end to the rear end, so that the horizontal guide groove 7 has an inlet portion 20 at the front end of the side wall 3. The horizontal guide groove 7 is extended horizontally toward the vicinity of the inlet portion 18 of the inclined guide slot 5 and terminated (21) just before intersecting the inclined slot 5.

A pair of slide rails (slide portions) 23, 23 capable of slidably engaging with the horizontal guide grooves 7 respectively are formed in the metering unit 6 so as to project. The slide rails 23 are formed integrally on opposite side walls 26 of a synthetic resin unit housing 24 so as to be extended horizontally from the front end of the unit housing 24 to the rear end thereof.

Figure 3:
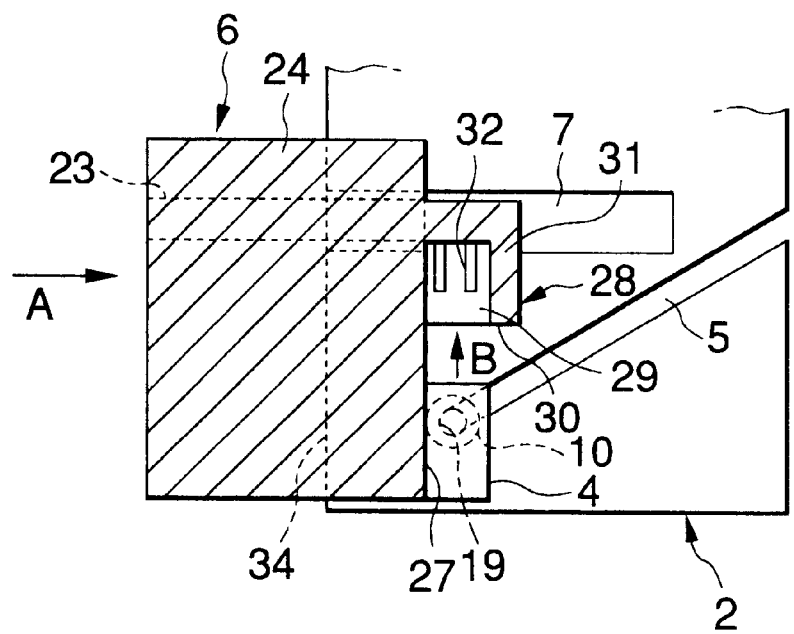
FIG. 3 is a vertical sectional view showing an initial state in which a metering unit is inserted in a meter receiving portion of an instrument panel.

A pair of female connectors 28, 28 capable of fitting the instrument panel-side male connectors 4 are disposed on the rear wall 27 of the unit housing 24. Each of the female connectors 28 is located so as to face downward and has an opening (connector fitting surface) 30 of a connector fitting chamber 29 in the lower side as shown in FIG. 3. Connector housings 31 for the female connectors 28 are formed so as to be integrated with the unit housing 24. A plurality of male terminals 32 are provided in the connector fitting chamber 29 so as to project. Like the guide rails 23, the female connectors 28 are disposed in the upper side of the metering unit 6. As shown in FIG. 1, a front cover 25 is attached to the unit housing 24 and a frame pad 33 is screwed to the front cover 25.

As shown in FIG. 3, each of the instrument panel-side male connectors 4 is disposed in the end portion 19 of the inclined guide slot 5, that is, in the frontal lower side of the meter receiving portion 2 while the slide protrusion 10 is engaged with the inclined guide slot 5. The metering unit 6 is then inserted into the meter receiving portion 2 through the front-side opening 34, as indicated by the arrow A, while the slide rails 23 are engaged with the horizontal guide grooves 7. The instrument panel-side male connectors 4 abut on the rear wall 27 of the metering unit 6. The metering unit-side female connectors 28 are located so as to face the upper side of the male connectors 4.

When the metering unit 6 in this condition is further pushed into the receiving portion 2, the male connectors 4 pressed in the same direction move obliquely upward along the inclined guide slots 5 and slide up toward the female connectors along the rear wall surface 4 of the metering unit 6, as indicated by the arrow B. With the pushing of the metering unit 6 into the receiving portion 2, the male and female connectors 4 and 28 are fitted to each other automatically. As a result, installation of the metering unit 6 and fitting of the connectors 4 and 28 are completed simultaneously as shown in FIG. 4.

On the other hand, the male and female connectors 4 and 28 are automatically disconnected from each other when the metering unit 6 is pulled out of the receiving portion 2 in the direction of the arrow C. That is, the male connectors 4 move down along the inclined guide slots 5 as indicated by the arrow D so as to be separated from the fixed-side female connectors 28.

Figure 4:
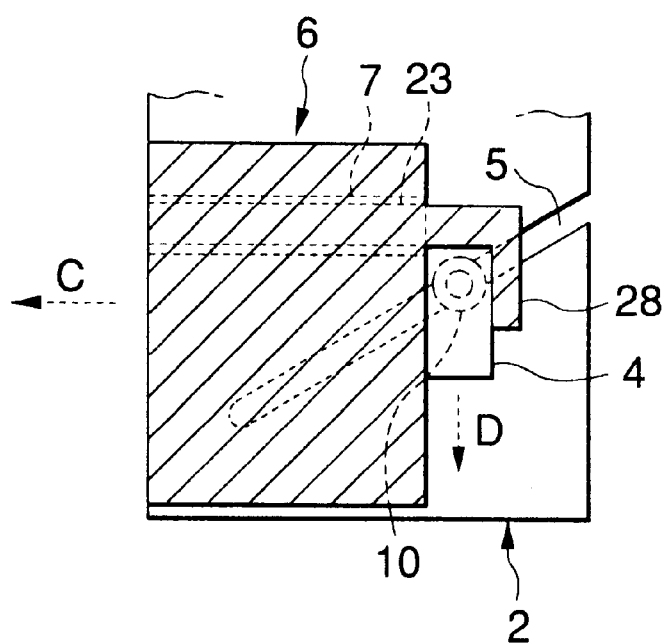
FIG. 4 is a vertical sectional view showing a state in which the metering unit is pushed in so that the connectors on the metering unit side are connected to the connectors on the instrument panel side.
Figure 5:
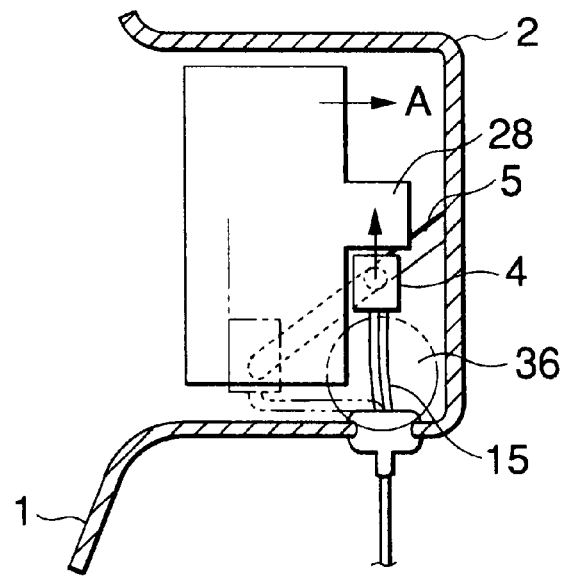
FIG. 5 is a vertical sectional view showing a state of the wire harness on the instrument panel side when the metering unit is inserted into the meter receiving portion.

In the connector fitting state in FIG. 4, the instrument panel 1-side wire harnesses 15 are located in a free space 36 under the connectors as shown in FIG. 5. This free space 36 is located in a direction perpendicular to the apparatus pushing direction A. With the obliquely upward movement of the instrument panel-side male connectors 4 along the inclined guide slots 5, the wire harnesses 15 rise slowly as if they swung from a state in which they lie down horizontally in the meter receiving portion 2. As a result, the wire harnesses 15 are located vertically without slackening as shown in FIG. 5. With the use of the free space 36 under the connectors in the aforementioned manner, not only space saving in the meter receiving portion 2 is attained but also the disadvantage that the wire harnesses 15 are caught in between the instrument panel 1 and the connectors 4 when the apparatus is pushed in is prevented.

Figure 6:
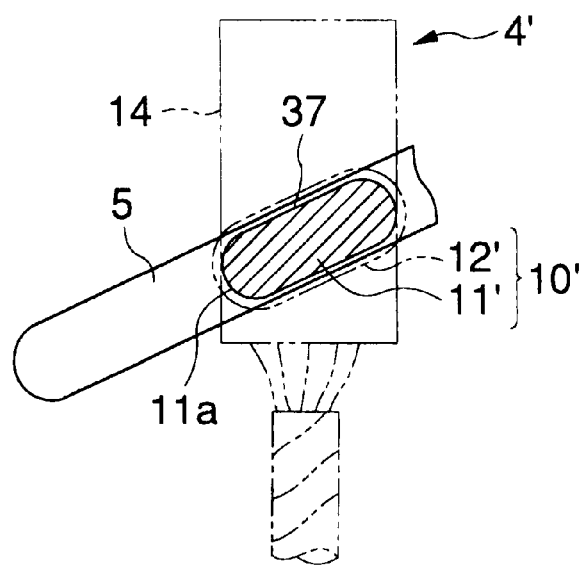
FIG. 6 is a vertical sectional view showing an embodiment of the slide protrusion of a connector.

Although the aforementioned embodiment has shown the case where the slide protrusions 10 of the male connectors 4 are formed circularly, each of the shaft portions 11' for the slide protrusions 10' of the instrument panel-side male connectors (connection bodies) 4' may be substantially vertically sectionally shaped like an ellipse or rectangle having flat surfaces 37 and the flat surfaces 37 may be arranged along the inclined guide slot 5, for example, as shown in FIG. 6 to prevent the male connector 4' from rotating and limit the connector fitting surface 14' to always face upward so that the male connector 4' and the female connector 28 can be fitted to each other more securely.

In this example, the flat surfaces 37 are formed in the upper and lower of the shaft portion 11' so as to be parallel with each other. Guide semicircular portions 11a are formed in opposite sides of the shaft portion 11'. A flange-like head portion 12' is formed at an end of the shaft portion 11' so as to be connected to the shaft portion 11'.

Figure 7:
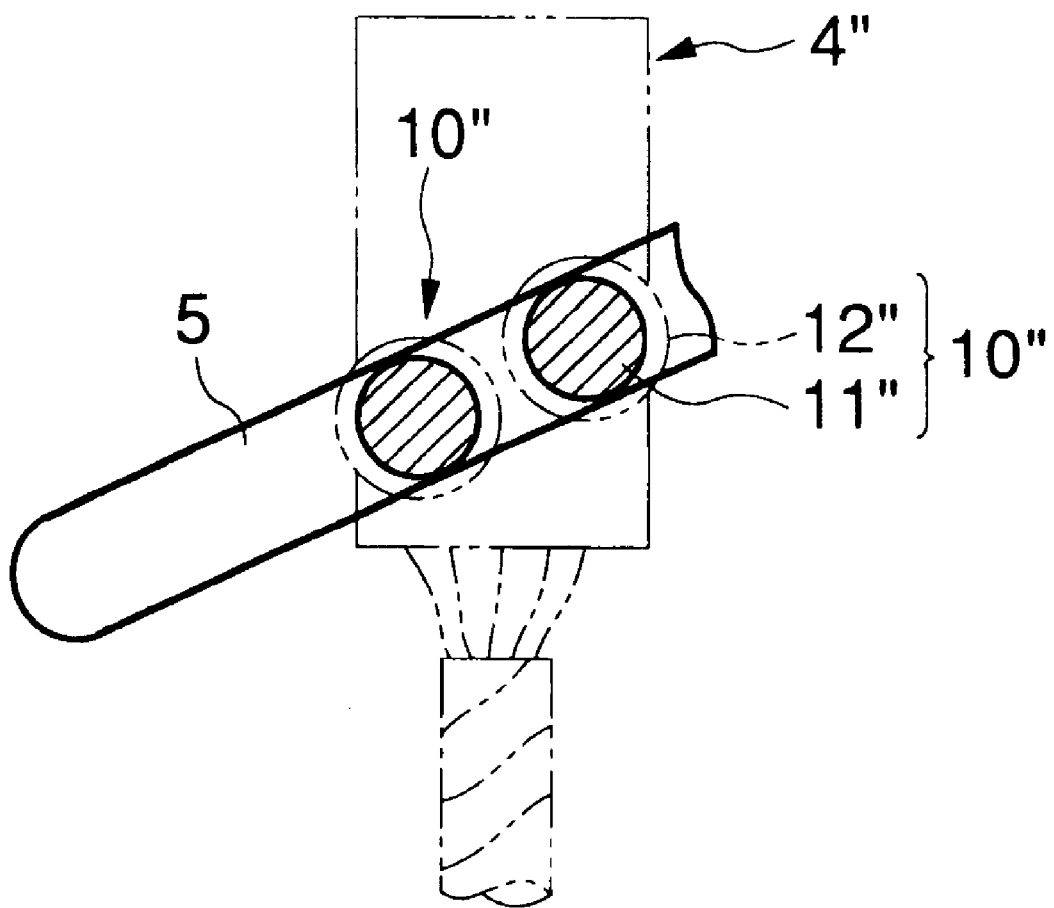
FIG. 7 is a vertical sectional view showing another embodiment of the slide protrusion.

Alternatively, the structure may be such that two, left and right columnar slide protrusions 10" are provided side by side obliquely on one side wall of the connector (connection body) 4" so as to be different in level from each other as shown in FIG. 7. Because the two slide protrusions 10" are simultaneously engaged with the inclined guide slots 5, the connector 4" is prevented from rotating. A large-diameter head portion 12" is formed at an end of the shaft portion 11".

Figure 8:
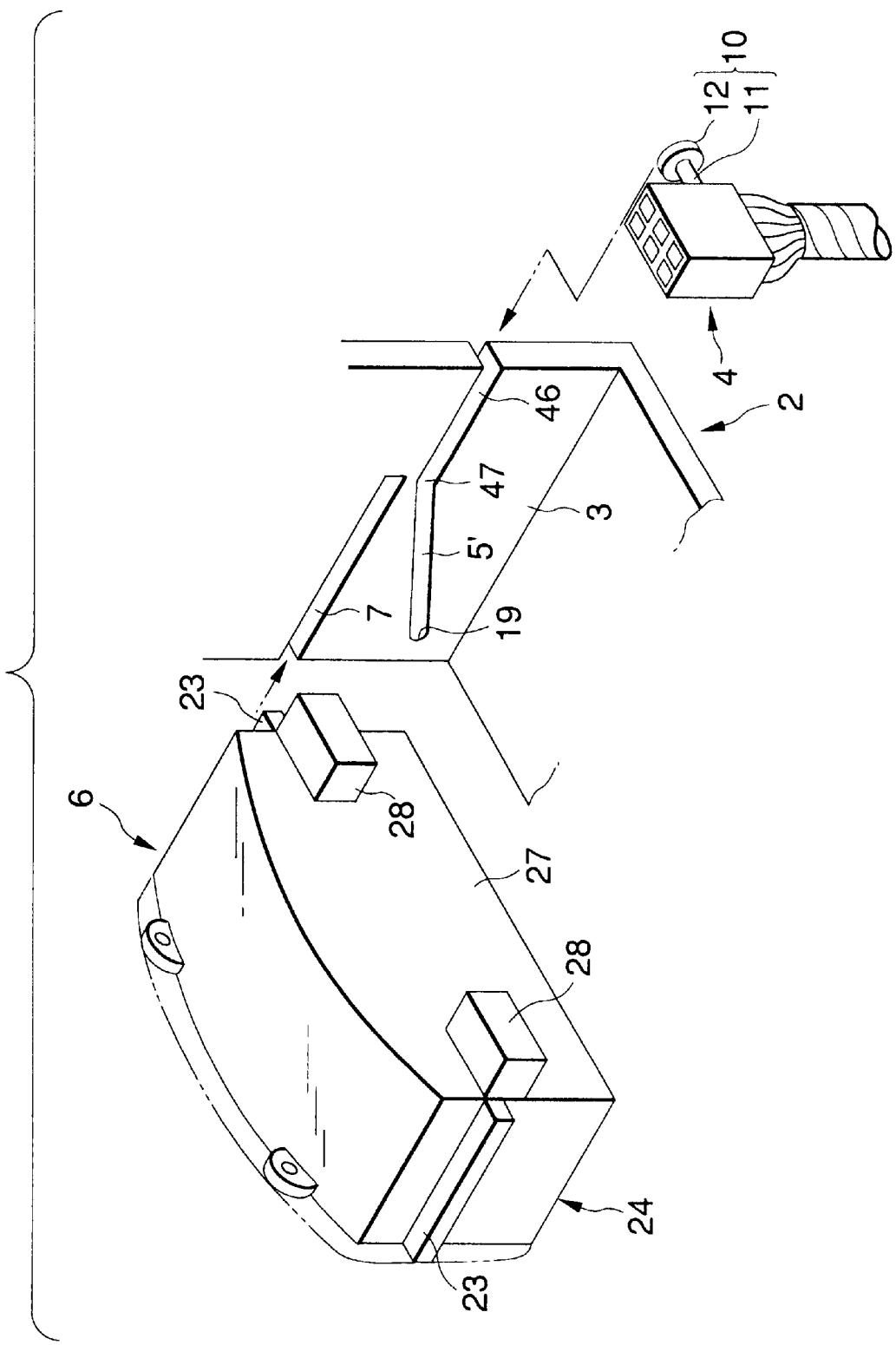
FIG. 8 is an exploded perspective view showing a modification of the connector connection structure.
Figure 9:
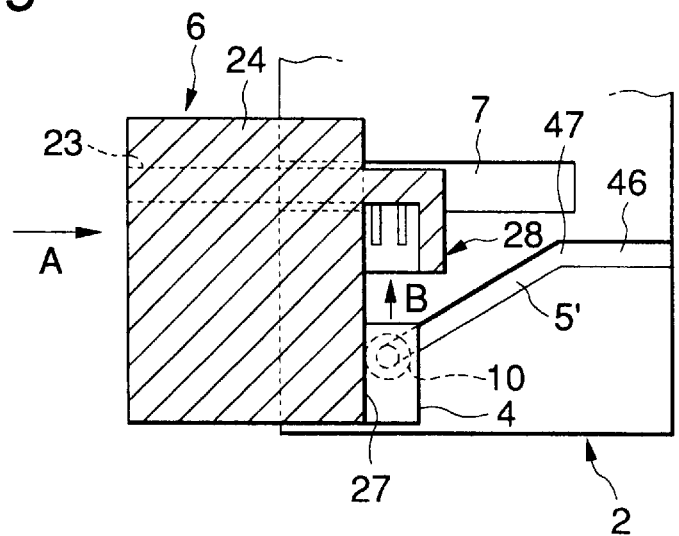
FIG. 9 is a vertical sectional view showing an initial state in which the metering unit is inserted into the meter receiving portion.
Figure 10:
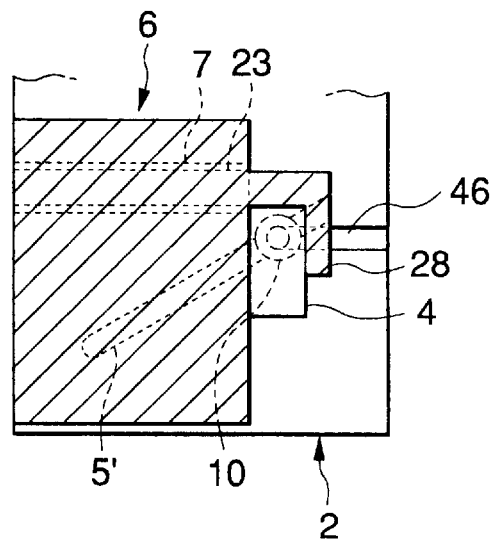
FIG. 10 is a vertical sectional view showing a state in which the connectors are fitted to one another perfectly.

FIGS. 8 to 10 show a modification of the aforementioned first embodiment.

As shown in FIG. 8, this connector connection structure has a feature that inclined guide slots 5' of a meter receiving portion 2 are formed so as to be shorter than those in the first embodiment and horizontal guide slots 46 are formed so as to be continued to the inclined guide slots 5' respectively. The shaft portions 11 of the slide protrusions (slide portions) 10 in the male connectors (connection bodies) 4 are fitted into the inclined guide slots 5' and the horizontal guide slots 46. The head portions 12 of the slide protrusions 10 slide along the side walls 3 respectively.

Since other configurations are the same as those in the first embodiment, the same parts are referenced correspondingly and detailed description of those parts will be omitted. The reference numeral 6 designates a metering unit; 27, a rear wall of the unit housing; 23, slide rails; 7, horizontal guide grooves to be fitted to the slide rails 23; and 28, female connectors. The horizontal guide grooves 7 are elongated long backward so that the rear wall 27 of the metering unit 6 presses the male connectors 4 toward the horizontal guide slots 46.

As shown in FIG. 9, the slide protrusions 10 of the male connectors 4 are inserted into the inclined guide slots 5' via the horizontal guide slots 46 respectively, so that the male connectors 4 are located so as to abut on the rear wall 27 of the metering unit 6. When the metering unit 6 in this condition is pushed in as expressed by the arrow A, the male connectors 4 ascend along the inclined guide slots 5' respectively as expressed by the arrow B. Consequently, as shown in FIG. 10, the male connectors 4 are fitted into the female connectors 28 thoroughly in the end portions of the inclined guide slots 5' (the start portions of the horizontal guide slots), that is, at intersections of the inclined guide slots 5' and the horizontal guide slots 46.

Figure 11:
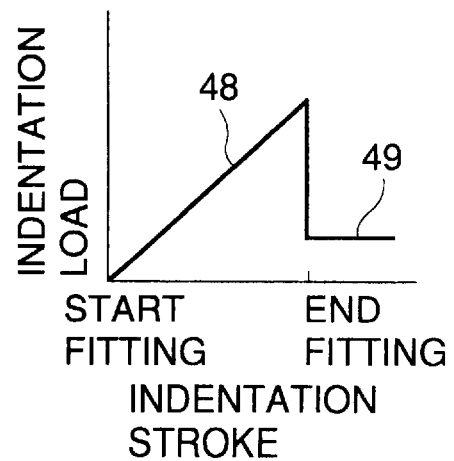
FIG. 11 is a graph showing the relation between the indentation load of the metering unit and the indentation stroke.

When an operating person further pushes the metering unit 6 inward continuously, the slide protrusions 10 enter into the horizontal guide slots 46. At that point of time, the indentation load of the metering unit 6 is lowered rapidly as shown in FIG. 11, so that the operating person can feel bodily the perfect fitting of the connectors 4 and 28. Accordingly, the connectors are prevented from being imperfectly fitted to each other because of the shortage of pressure upon the metering unit. In FIG. 11, the obliquely rising portion 48 expresses a state between the start of the fitting of the connectors and the completion of the fitting of the connectors and the rapidly lowered and horizontally extended portion 49 expresses a state in which the slide protrusions 10 enter into the horizontal guide slots 46.

The configuration of this example can be also applied to an embodiment using connector frames which will be described later.

Figure 12:
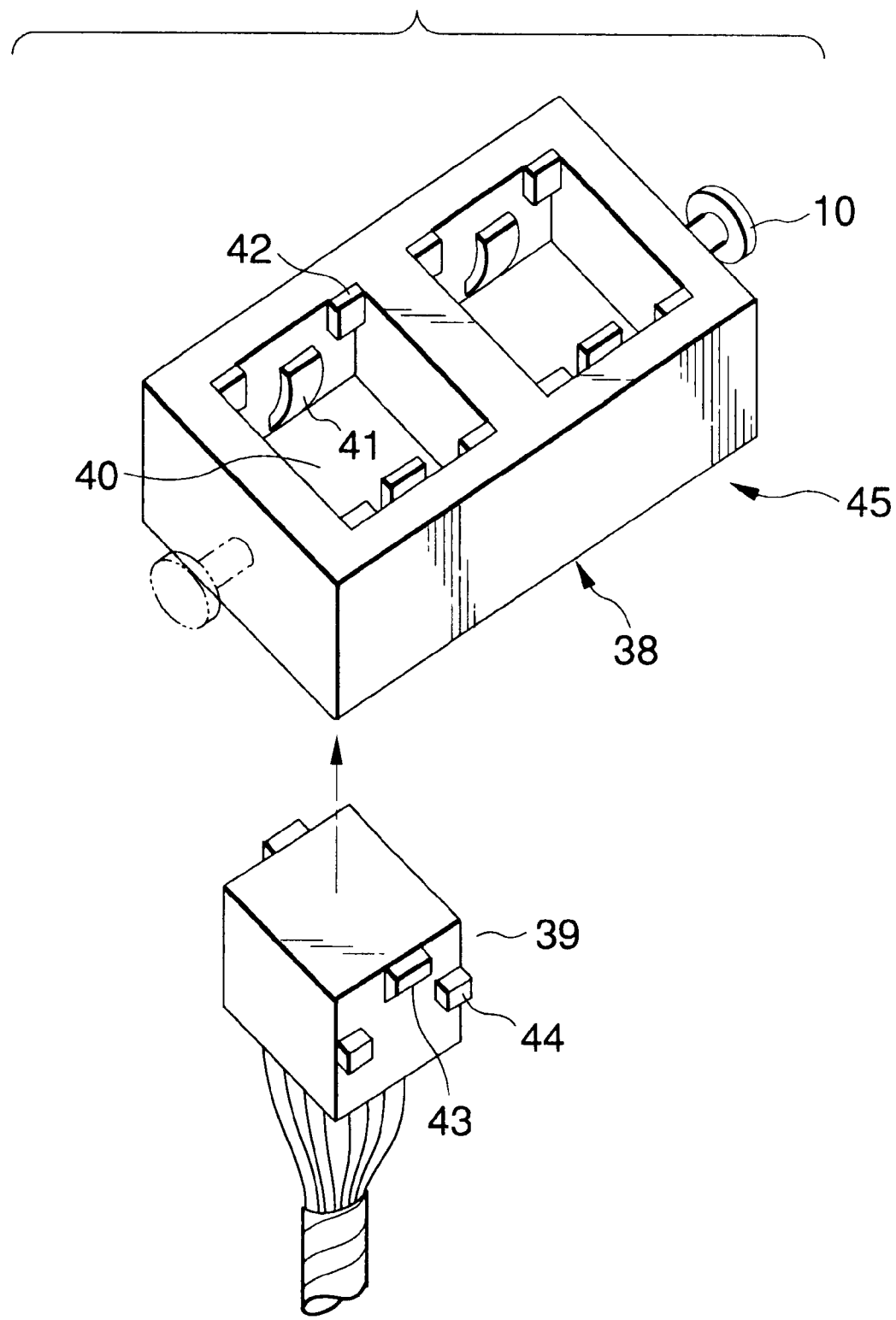
FIG. 12 is an exploded perspective view showing an example in which a slide protrusion is provided on a connector housing.

FIG. 12 shows an example of configuration of a connection body 45 in which the slide protrusion 10 is provided not on the connector 4 but on a connector frame 38 so that a plurality of connectors 39 are inserted into the connector frame 38. In this case, one slide protrusion 10 may be provided on one side of one connector frame 38 or two slide protrusions 10 may be provided on opposite sides of one connector frame 38 so as to correspond to one pair of inclined guide slots 5 in the meter receiving portion 2.

Flexible lock arms 41 and stopper protrusions 42 are provided in each of the connector receiving portions 40 in the connector frame 38 whereas engagement protrusions 43 to be fitted to the lock arms 41 and abutment protrusions 44 to be fitted to the stopper protrusions 42 are provided in each of the connectors 39. Alternatively, slide protrusions 10' as shown in FIGS. 6 and 7 may be provided on the connector frame 38.

Figure 13:
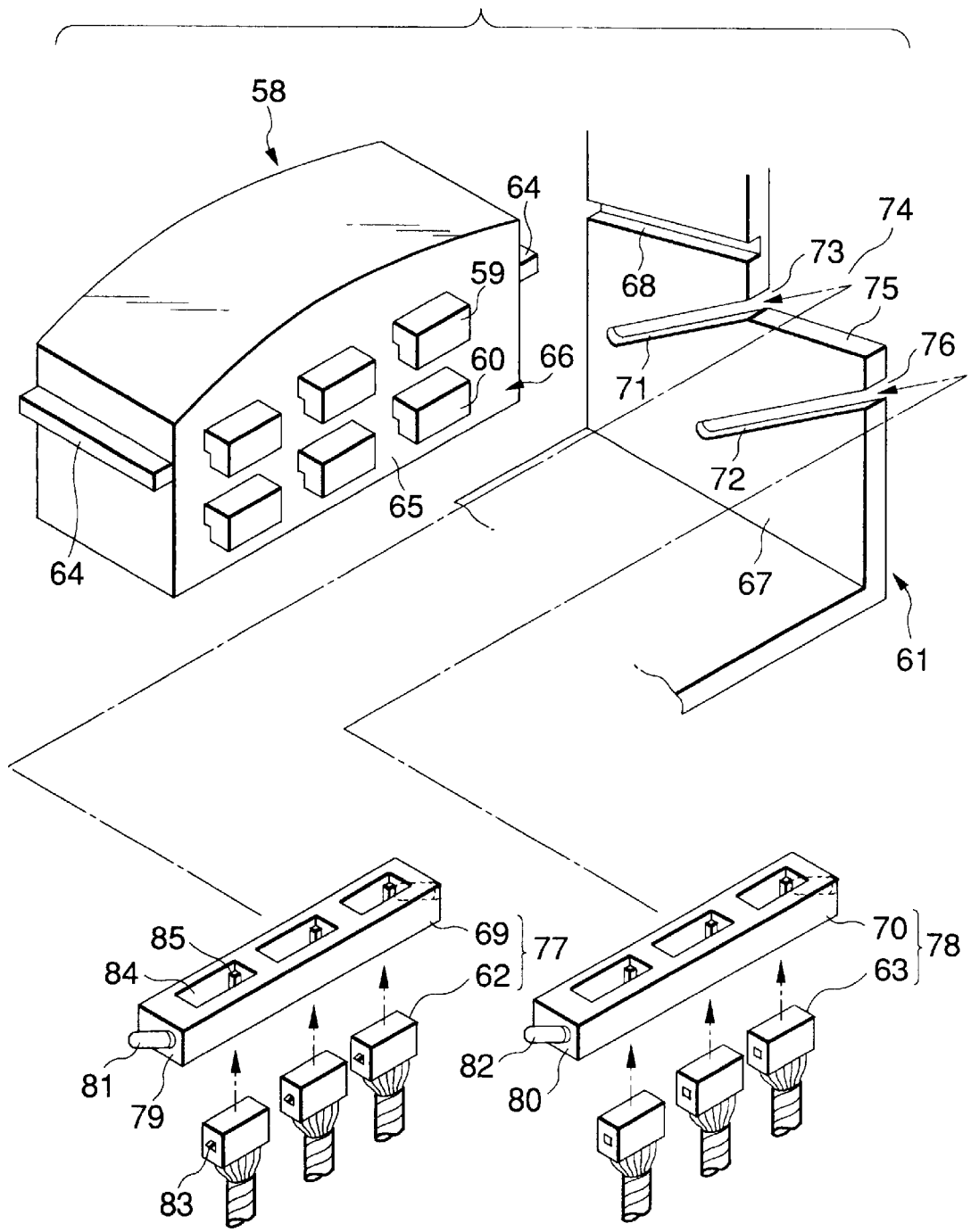
FIG. 13 is an exploded perspective view showing the overall of a second embodiment of the connector connection structure.

FIG. 13 shows a second embodiment of the connector-connection structure according to the present invention.

This structure is intended to fit upper and lower stages of male connectors 62 and 63 on instrument panel 61 to upper and lower stages of female connectors 59 and 60 on metering unit (apparatus) 58 stageously by a low insertion force.

Horizontal slide rails (slide portions) 64 are formed on the opposite sides of the metering unit 58 in the same manner as in the first embodiment. The upper and lower stages of female connectors 59 and 60 are provided vertically on the back wall 65 of the metering unit 58.

A pair of horizontal guide grooves (horizontal guide portions) 68 corresponding to the slide rails 64 are formed in the opposite side walls 67 of the meter receiving portion 66 of the instrument panel 61. Further, a pair of parallel inclined guide slots (inclined guide portions) 71 and 72 corresponding to the connector frames 69 and 70 for receiving male connectors 62 and 63 are formed below the horizontal guide groove 68 in each of the opposite side walls 67. The respective inclined guide slots 71 and 72 pierce the side walls 67 but do not have any such steps (16, 17) as described in the first embodiment.

The inclined guide slots 71 and 72 are defined to be disposed obliquely upward for the double purpose of: inserting the connector frames 69 and 70 easily into the inclined guide slots 71 and 72 by their own weight while sliding the connector frames 69 and 70; and preventing the connector frames 69 and 70 from dropping out of the inclined guide slots 71 and 72.

The upper inclined guide slots 71 are located in a front half of the meter receiving portion 66 whereas the lower inclined guide slots 72 are located in a rear half of the meter receiving portion 66. An inlet portion 73 in each of the upper inclined guide slots 71 is continued to a rectangular notch space (horizontal escape portion or horizontal notch portion) 74. The notch space 74 has a horizontal bottom portion 75 continued on the inclined guide slot 71. Each of the lower inclined guide slots 72 has an inlet portion 76 at the rear end of the side wall 67.

The connector frames 69 and 70 are prepared, by two in total, correspondingly to the upper and lower, two stages of female connectors 59 and 60 in the metering unit 58 respectively. The plurality of male connectors 62 and 63 are inserted into the connector frames 69 and 70 to thereby form connection bodies 77 and 78 respectively. Substantially elliptic slide protrusions 81 and 82 as shown in FIG. 6 are formed obliquely on opposite side walls 79 and 80 of the connector frames 69 and 70 respectively. The slide protrusions 81 of the first connector frame 69 are engaged with the upper inclined guide slots 71 whereas the slide protrusions 82 of the second connector frame 70 are engaged with the lower inclined guide slots 72. Protrusions 83 on respective side walls of the male connectors 62 and 63 are engaged with the lock arms 85 in the connector receiving portions 84 of the connector frames 69 and 70.

Figure 14:
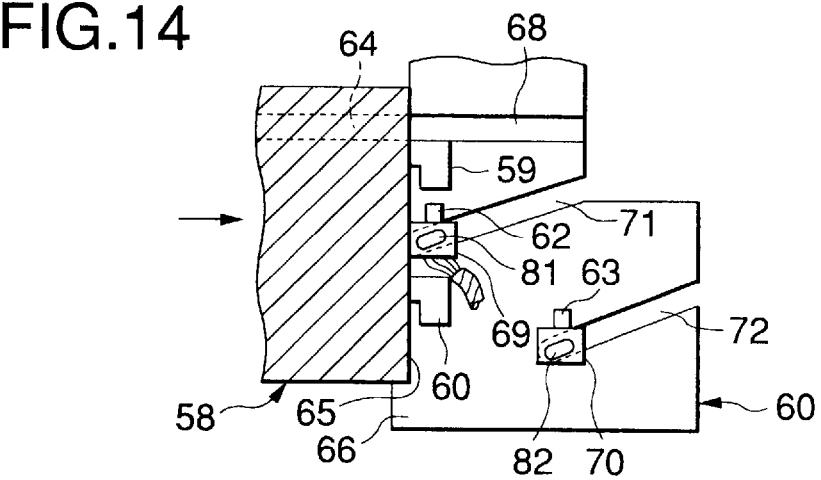
FIG. 14 is a vertical sectional view showing a state in which one connection body is fitted to the upper-stage connectors in this embodiment.
Figure 15:
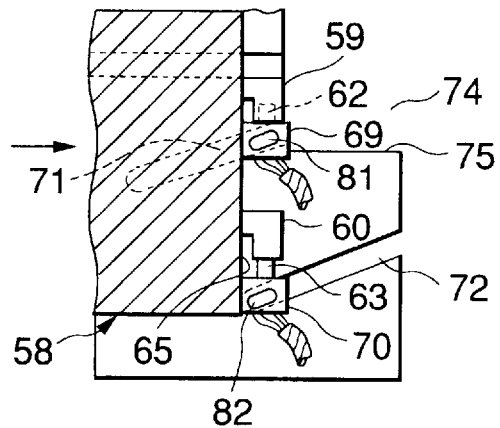
FIG. 15 is a vertical sectional view showing a state in which the other connection body is fitted to the lower-stage connectors in this embodiment.

FIGS. 14 and 15 show a sequence of states for connecting the female connectors 59 and 60 of the metering unit 58 to the male connectors 62 and 63 of the instrument panel 61.

That is, as shown in FIG. 14, the metering unit 58 is pushed into the meter receiving portion 66 as indicated by the arrow while the slide rails 64 of the metering unit 58 are engaged with the horizontal guide grooves 68 of the instrument panel 61. As a result, the upper connector frame 69 first abuts on the back wall 65 of the metering unit 58 and is pressed by the back wall 65 so as to move obliquely upward along the upper inclined guide slots 71.

Accordingly, as shown in FIG. 15, the male connectors 62 of the upper connector frame 69 are fitted into the upper-stage female connectors 59. When the metering unit 58 is further pushed into the water receiving portion 66, the slide protrusions 81 of the upper connector frame 69 are led out to the notch space (horizontal escape portion) 74 of the instrument panel 61 from the inlet portions 73 (FIG. 9) of the inclined guide slots 71. As a result, the slide protrusions 81 move horizontally along the horizontal bottom portions 75 or is released into the notch space 74. Accordingly, as shown in FIG. 12, the upper connector frame 69 move horizontally in the notch space 74.

Figure 16:
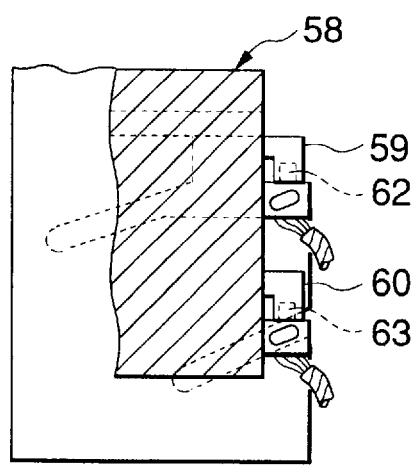
FIG. 16 is a vertical sectional view showing a state in which the connectors are fitted to one another perfectly.

On the other hand, just after the fitting of the upper connectors 59 and 62 in FIG. 15 is completed, the lower connector frame 70 abuts on the back wall 65 of the metering unit 58 and moves obliquely upward along the inclined guide slots 72. Accordingly, as shown in FIG. 16, the fitting of the male connectors 63 into the lower-stage female connectors 60 is performed. That is, the fitting of the upper connectors 59 and 62 to each other and the fitting of the lower connectors 60 and 63 to each other are completed successively in different timing.

Accordingly, not only the pushing force of the metering unit 58 becomes constant but also the pushing force may be made small, so that the work is easy and the workability is good. Furthermore, in the case where the connectors 59, 62, 60 and 63 are to be disconnected from each other, the work of taking out the metering unit 58 can be carried out easily by a constant small force because the lower-stage connectors 60 and 63 are separated from each other first and then the upper-stage connectors 59 and 62 are separated from each other when the metering unit 58 is pulled out.

As described above, in this embodiment, the installation and separation of the metering unit 58 in which multi-pole connectors 59 and 60 are concentrated, and the connection and disconnection of the connectors can be performed easily and securely by a constant small force, so that the connectors 59, 62, 60 and 63 are prevented from being improperly fitted to each other because of shortage of the pushing force of the metering unit 58.

Alternatively, in order to form multi-pole connectors (connection bodies), connector frames 69 and 70 and connectors 62 and 63 may be formed integrally with each other so that the connectors 62 and 63 are not held in the connector frames 69 and 70 respectively. Alternatively, the upper and lower connectors 62 and 63 may be used without use of the connector frames 69 and 70 so that connector fitting is performed stageously.

Figure 17:
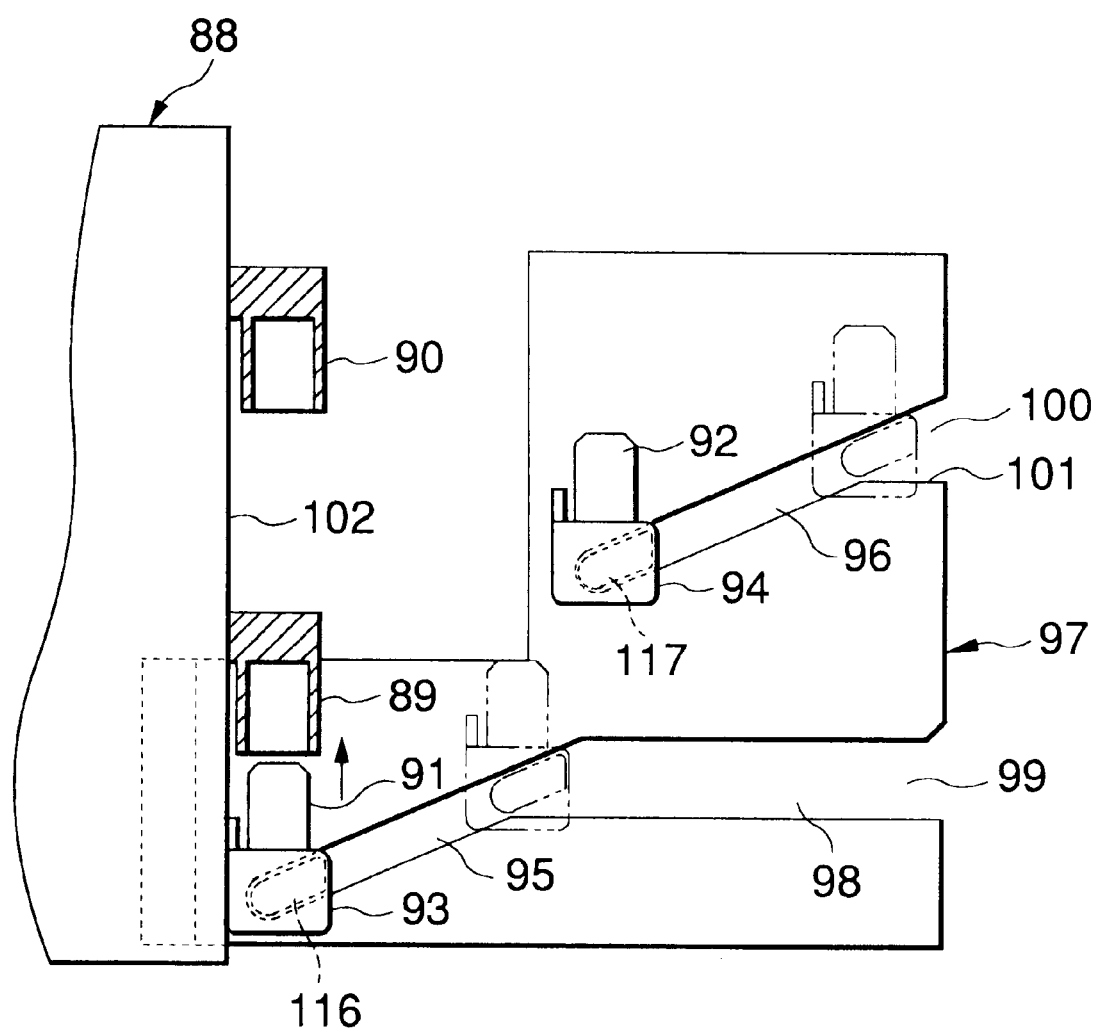
FIG. 17 is a vertical sectional view showing a fitting start state of the lower-stage connectors in a structure similar to that of the second embodiment.
Figure 18:
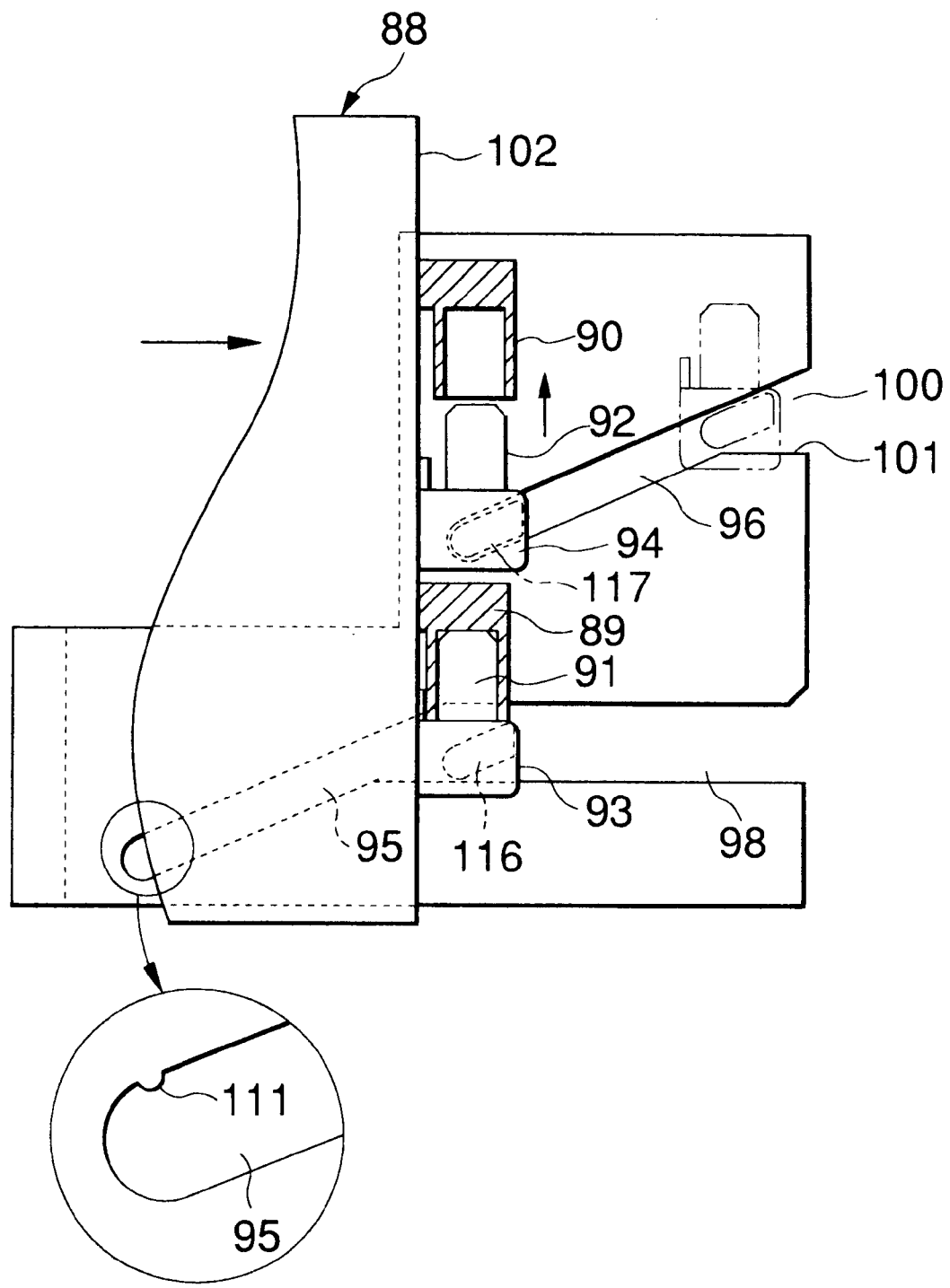
FIG. 18 is a vertical sectional view showing a fitting start state of the upper-stage connectors in this structure.

FIGS. 17 and 18 show a connector-connection structure similar to the second embodiment.

This structure is designed so that lower male connectors 91 are fitted into lower-stage female connectors 89 of a metering unit 88 before upper male connectors 92 are fitted into upper-stage female connectors 90. This structure is basically the same as in the second embodiment.

Lower inclined guide slots 95 are located in a front half of an instrument panel 97 whereas upper inclined guide slots 96 are located in a rear half of the instrument panel 97. The lower inclined guide slots 95 are continued to wide horizontal slots (horizontal escape portions or horizontal notch portions) 98 respectively. The horizontal slots 98 have inlet portions 99 respectively at the rear end of the instrument panel 97. The upper inclined guide slots 96 are located above the horizontal slots 98. The upper inclined guide slots 96 have inlet portions 100 respectively at the rear end of the instrument panel 97. The inlet portions 100 have short horizontal bottom portions 101 respectively.

In FIG. 17, the back wall 102 of the metering unit 88 abuts on the lower connector frame 93 and the slide protrusions 116 of the connector frame 93 ascend along the inclined guide slots 95 respectively, so that the male connectors 91 are fitted into the lower-stage female connectors 89 as shown in FIG. 18. Just after the male connectors 91 are fitted into the lower-stage female connectors 89, the metering unit 88 abuts on the upper connector frame 94 and the slide protrusions 117 of the connector frame 94 ascend along the inclined guide slots 96 respectively. As a result, the male connectors 92 are fitted into the upper-stage female connectors 90 respectively.

In FIG. 18, with the horizontal movement of the lower-stage female connectors 89 integrally with the metering unit 88, the slide protrusions 116 of the lower connector frame 93 enter into the horizontal slots 98 respectively. As a result, while the male connectors 91 are fitted into the female connectors 89, the male connectors 91 move horizontally integrally with the female connectors 89. Further, the slide protrusions 117 of the upper connector frame 94 move nearly horizontally along the horizontal bottom portions (horizontal escape portions) 101 of the inlet portions 100 as indicated by the chain line after the male connectors 92 are fitted into the upper-stage female connectors 90. Accordingly, the stroke of pushing the metering unit 88 is set to be slightly long, so that the fitting of the connectors can be performed securely without improper fitting.

Figure 19:
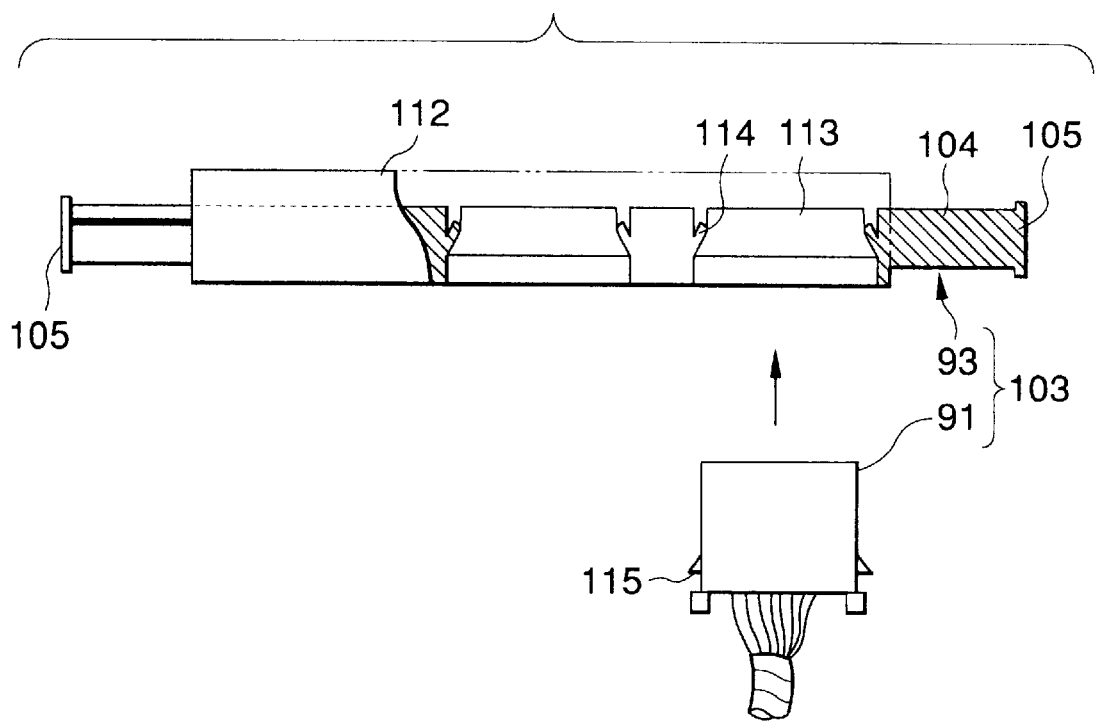
FIG. 19 is a vertical sectional view showing a connection body in a similar example.
Figure 20:
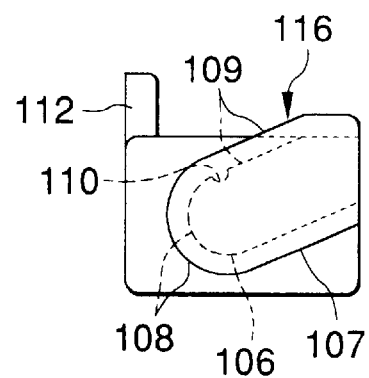
FIG. 20 is a side view showing the slide protrusion of the connection body.

FIG. 19 shows a connection body 103 composed of the aforementioned synthetic resin connector frame 93 and the aforementioned male connectors 91. Vertical wide side plate portions 105 are formed at opposite ends of a horizontal substrate portion 104 of the connector frame 93 so as to be connected to the substrate portion 104. Slide protrusions 116 inclined as shown in FIG. 20 are formed in the side plate portions 105 respectively. Each of the slide protrusions 116 is shaped substantially like an ellipse or rectangle and has a semicircular portion 108 and parallel flat portions (flat surfaces) 109 continued to the semicircular portion 108, in the shaft portion 106 and handguard-like head portion 107.

A concave portion 110 for temporary locking is formed in the shaft portion 106 in the vicinity of the boundary between the semicircular portion 108 and the flat portion 109. As shown in an enlarged view of FIG. 18, a convex portion 111 for engagement with the corresponding concave portion 110 is formed in the end portion of the inclined guide slot 95. The convex portion 111 is engaged with the concave portion 110, so that the connector frame 93 is temporarily held when set in the instrument panel 97 (FIG. 17) to thereby prevent the connector frame 93 from dropping out of the inclined guide slots 95 at the time of installation.

An abutment plate 112 is provided vertically at the front end of the substrate portion 104 (FIGS. 19 and 20) so as to be one-step high. The abutment plate 112 comes into surface contact with the back wall 102 of the metering unit 88 securely and slides along the back wall 102, so that the abutment plate 112 can ascend smoothly, as shown in FIG. 18.

Further, a plurality of connector receiving portions 113 are provided side by side in the substrate portion 104. Flexible lock arms 114 are provided in each of the connector receiving portions 113. Connectors 91 having engagement protrusions 115 corresponding to the lock arms 114 are inserted into the connector receiving portions 113 respectively from below.

Incidentally, more than two inclined guide slots may be provided as the inclined guide slots 95 and 96. In this case, a plurality of rows of female connectors are successively connected to a plurality of stages of male connectors in the metering unit so that a more multi-pole connection structure can be obtained. Further, the aforementioned structure can be applied not only to installation of the metering unit in the car instrument panel but also to installation of any apparatus other than the metering unit in any assembling portion other than the instrument panel.

Figure 21:
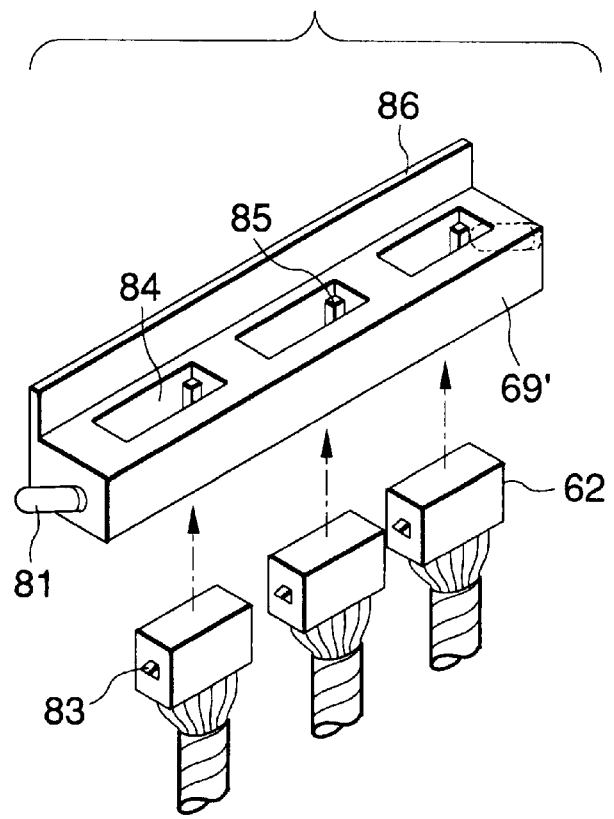
FIG. 21 is an exploded perspective view showing an example in which an abutment plate is provided in a connector frame.
Figure 22:
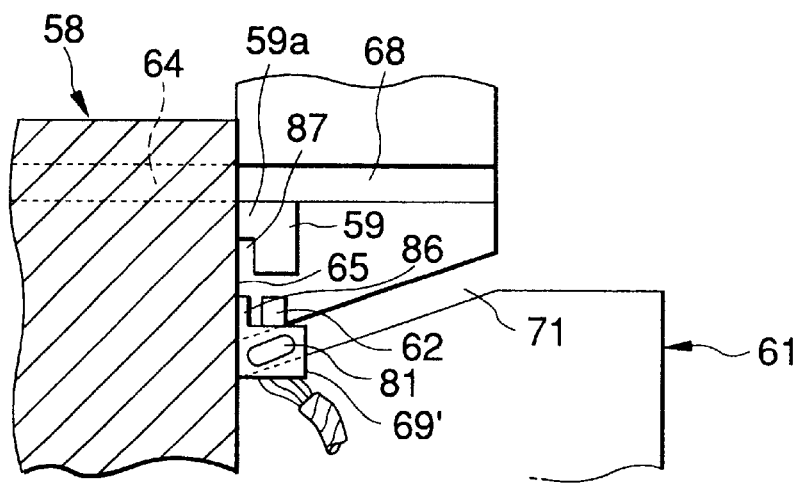
FIG. 22 is a vertical sectional view showing a state in which the abutment plate abuts on the metering unit.
Figure 23:
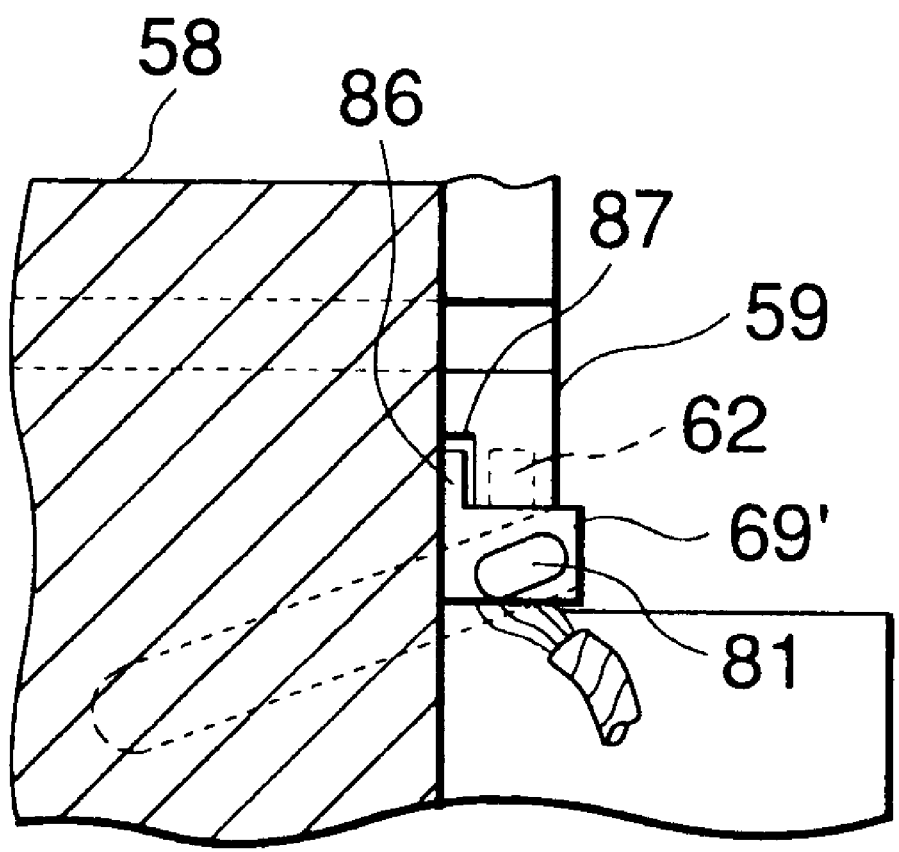
FIG. 23 is a vertical sectional view showing a state in which the connectors are fitted to one another.
Figure 24:
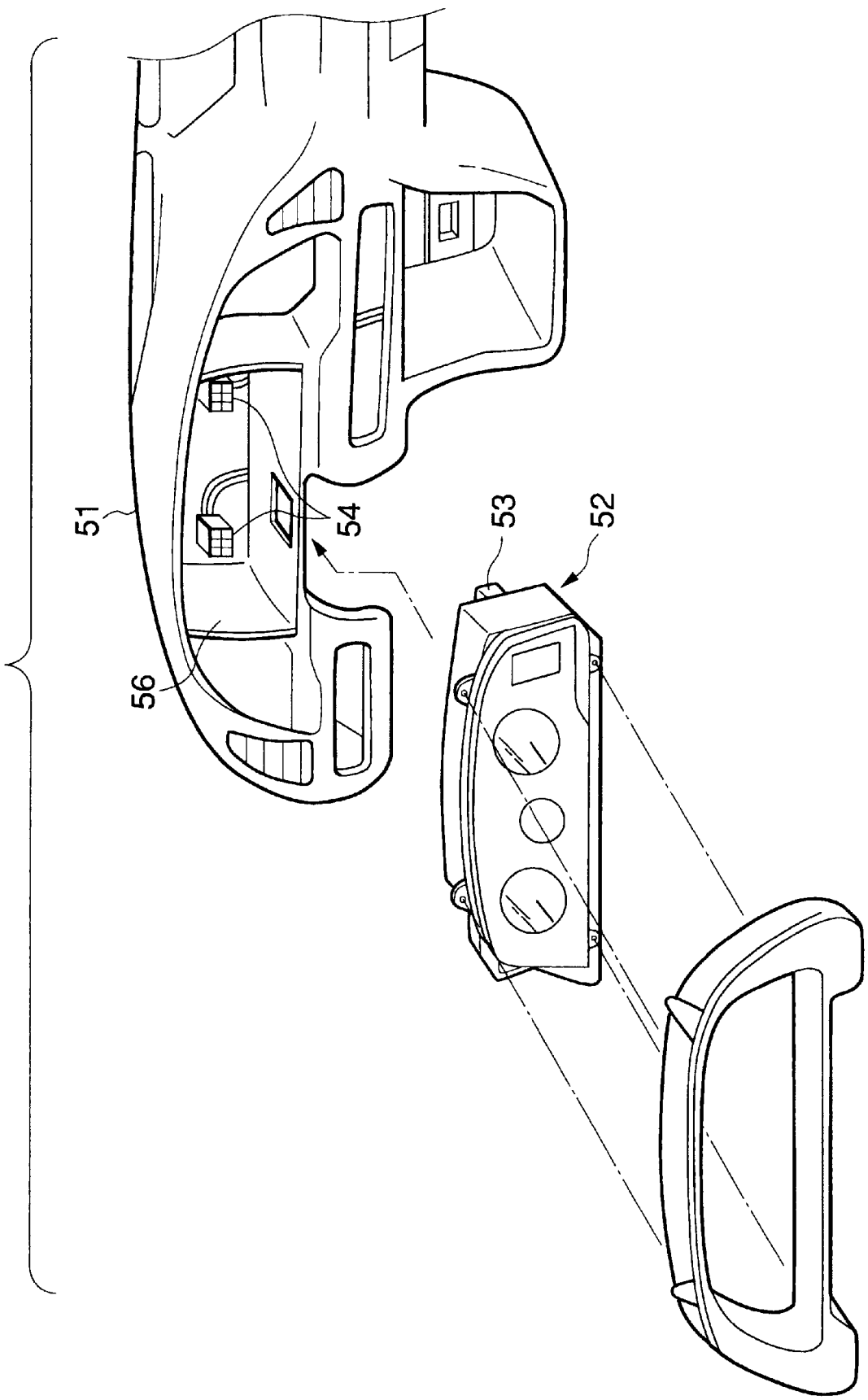
FIG. 24 is an exploded perspective view showing the overall configuration of a conventional connector connection structure.
Figure 25:
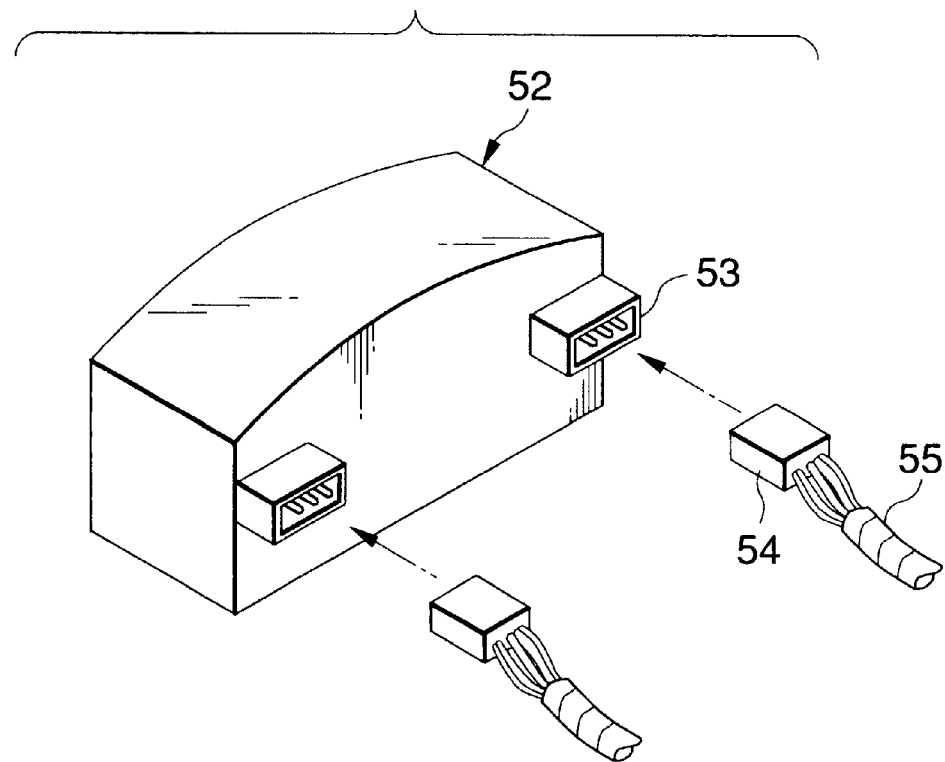
FIG. 25 is an exploded perspective view showing a main part of the conventional connector connection structure.
Figure 26:
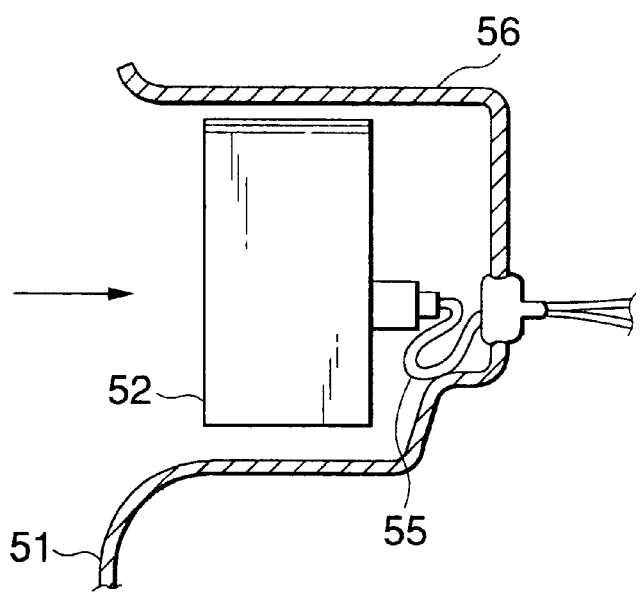
FIG. 26 is a vertical sectional view showing a problem in the prior art.

FIGS. 21 to 23 show an example in which an abutment plate for abutting on the metering unit 58 is provided in a connector frame 69'. This configuration corresponds to the second embodiment (FIG. 13). The same parts are reference correspondingly.

As shown in FIG. 21, the abutment plate 86 is formed at a front end of the connector frame 69' so as to project vertically. The contact area between the connector frame 69' and the rear wall 65 of the metering unit 58 (FIG. 22) is increased by the abutment plate 86, so that the posture of the connector frame 69' is stabilized. A receiving space (receiving portion) 87 for receiving the abutment plate 86 is formed between the male connector 59 on the metering unit 58 side and the rear wall 65 of the metering unit 58. The receiving space 87 is designed so that the lower space of the horizontal protecting portion 59a of the female connector 59 is used effectively.

In FIG. 21, the reference numeral 81 designates a slide protrusion; 62, male connectors; 84, connector receiving portions; 83, protrusions; and 85, lock arms to be fitted to the protrusions 83 respectively. In FIG. 22, the reference numeral 61 designates a meter receiving portion; 64, a slide rail; 68, a horizontal guide groove; and 71, an inclined guide slot.

As shown in FIG. 22, the connector frame 69' is located so as to abut on the rear wall 65 of the metering unit 58 at the front end of the inclined guide slot 71. In this occasion, because the abutment plate 86 touches the rear wall 65 in a wide area, the connector frame 69' ascends with a stable posture smoothly without rattling when the metering unit 58 is pushed in as shown in FIG. 23. Accordingly, the male connectors 62 on the connector frame 69' are fitted securely and smoothly into the female connectors 59 on the metering unit 58 side. The abutment plate 86 becomes no hindrance because the abutment plate 86 is received in the receiving space 87 on the female connector 59 side.

As described above, according to the invention stated in the present invention, for example, the installation of a metering unit in a car instrument panel and the fitting of the connectors on the instrument panel side to the connectors on the metering unit side can be performed simultaneously. Accordingly, connector fitting work is not required, so that the number of work steps is reduced. According to the invention stated in the present invention, the installation of a metering unit and the connection of a large number of connectors can be performed simultaneously. According to the invention stated in the present invention, connectors are fitted to one another with different timing so that a metering unit can be pushed in securely with a predetermined low force. Accordingly, not only the installation workability is improved but also the connectors are prevented from being imperfectly fitted to one another because of the shortage of a pushing force.

According to the invention stated in the present invention, the posture of a connector frame is stabilized by the contact between an abutment plate and an apparatus, so that the connector frame is prevented from rattling. Accordingly, the connectors can be fitted to one another smoothly and securely. According to the invention stated in the present invention, the abutment plate is received in a receiving portion so that both the effective use of space and the space saving are attained in the connection portion. According to the invention stated in the present invention, the perfect fitting of connectors and the entrance of slide portions of connection bodies into horizontal guide portions are performed simultaneously, so that the indentation load on the apparatus is lowered rapidly. Accordingly, the operating person can detect the perfect fitting of the connectors securely, so that the connectors are prevented from being imperfectly fitted to one another.

According to the invention stated in the present invention, flat portions of slide portions are brought into surface-contact with inclined guide portions or two slide protrusions are brought into two-point contact with inclined guide portions. Accordingly, the connectors are prevented from rotating, so that there is no displacement when the connectors are fitted to one another. Accordingly, the connector fitting accuracy is improved. According to the invention stated in the present invention, wire harnesses led from the connectors do not exist in the apparatus-pushing side. Accordingly, the wire harnesses are prevented from being caught in the apparatus when the apparatus is pushed in.

What is claimed is:

1. A connector-connection structure comprising:

an apparatus and a receiving portion for receiving said apparatus;

first slide portions provided on said apparatus;

connectors disposed on an insert end of said apparatus;

guide portions provided in said receiving portion, said guide portions mating with said first slide portions;

inclined guide portions provided in said receiving portion, connection bodies provided in said receiving portion; and second slide portions provided on said connection bodies, said second slide portions mating with said inclined guide portions, wherein said second slide portions of said connection bodies slide in said inclined guide portions and said first slide portions of said apparatus slide in said guide portions so that said apparatus abuts on said connection bodies and said connectors of said apparatus and said connection bodies of said receiving portion are disposed so as to face each other in a connection fitting direction.

2. A connector-connection structure according to claim 1, wherein said connectors are provided in a plurality of stages on said insert end of said apparatus, and said inclined guide portions are provided in a plurality of stages in said receiving portion so that said second slide portions of said connection bodies are fitted to said inclined guide portions successively with different timing for different ones of said connectors.

3. A connector-connection structure according to claim 2, wherein said plurality of stages of inclined guide portions are provided so as to be displaced from each other successively in a direction that said apparatus is inserted into said receiving portion.

4. A connector-connection structure according to claim 3, wherein inclined guide portions positioned closer to said apparatus as said apparatus is inserted into said receiving portion are continued to horizontal escape portions respectively, and inclined guide portions positioned farther from said apparatus are located one of above and below said horizontal escape portions respectively.

5. A connector-connection structure according to claim 1, wherein each of said connection bodies is defined by a connector frame having a plurality of connectors.

6. A connector-connection structure according to claim 5, wherein an abutment plate for abutting on said apparatus is provided in said connector frame.

7. A connector-connection structure according to claim 6, wherein a receiving portion for receiving said abutment plate is formed between said apparatus and said connectors.

8. A connector-connection structure according to claim 1, wherein a horizontal guide portion is continued to each of said inclined guide portions so that said connectors are completely fitted with said connection bodies when said connection bodies have been slid along said inclined guide portions to intersections of said inclined guide portions and said horizontal guide portions, and said second slide portions of said connection bodies enter into said horizontal guide portions.

9. A connector-connection structure according to claim 1, wherein each of said second slide portions of said connection bodies has a flat portion which is brought into contact with one of said inclined guide portions.

10. A connector-connection structure according to claim 1, wherein each of said second slide portions of said connection bodies is defined by two columnar slide protrusions which are parallel with each other.

11. A connector-connection structure according to claim 1, wherein wire harnesses led out of said connection bodies respectively are disposed in a free space in said receiving portion so as to be perpendicular to a direction that said apparatus is inserted into said receiving portion.

* * * * *